May 7, 1929.   J. G. VINCENT   1,712,462
MOTOR VEHICLE
Filed Oct. 30, 1925   2 Sheets-Sheet 1

Inventor
Jesse G. Vincent
By  Miller Tibbetts
Attorney

May 7, 1929. J. G. VINCENT 1,712,462
MOTOR VEHICLE
Filed Oct. 30, 1925  2 Sheets-Sheet 2

Inventor
Jesse G. Vincent
By Milton Tibbitts
Attorney

Patented May 7, 1929.

1,712,462

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed October 30, 1925. Serial No. 65,760.

This invention relates to motor vehicles and particularly to the frame, axle and brake construction thereof.

One of the objects of the present invention is to simplify the brake operating connections of a motor vehicle.

Another object of the invention is to provide a simple brake operating mechanism for the front or steering wheel brakes of a motor vehicle.

Another object of the invention is to provide connections from the brakes on the steering wheel of a motor vehicle to the frame of the vehicle without interfering with the movement of the axle relative to the frame.

Another object of the invention is to provide a brake operating shaft directly over the steering axle and pivotally connecting one end of that shaft with the frame without interfering with the movement of the axle relative to the frame.

Another object of the invention is to provide a brake operating mechanism in connection with the frame with pressure lubrication.

Other objects of the invention will appear from the following description taken in connection with the drawings, which form a part of this specification, and in which:

Fig. 1 is a transverse section through a motor vehicle taken adjacent the steering axle;

Fig. 1ª is a detail, illustrating the portions of the brake operating shaft separated.

Figure 1:
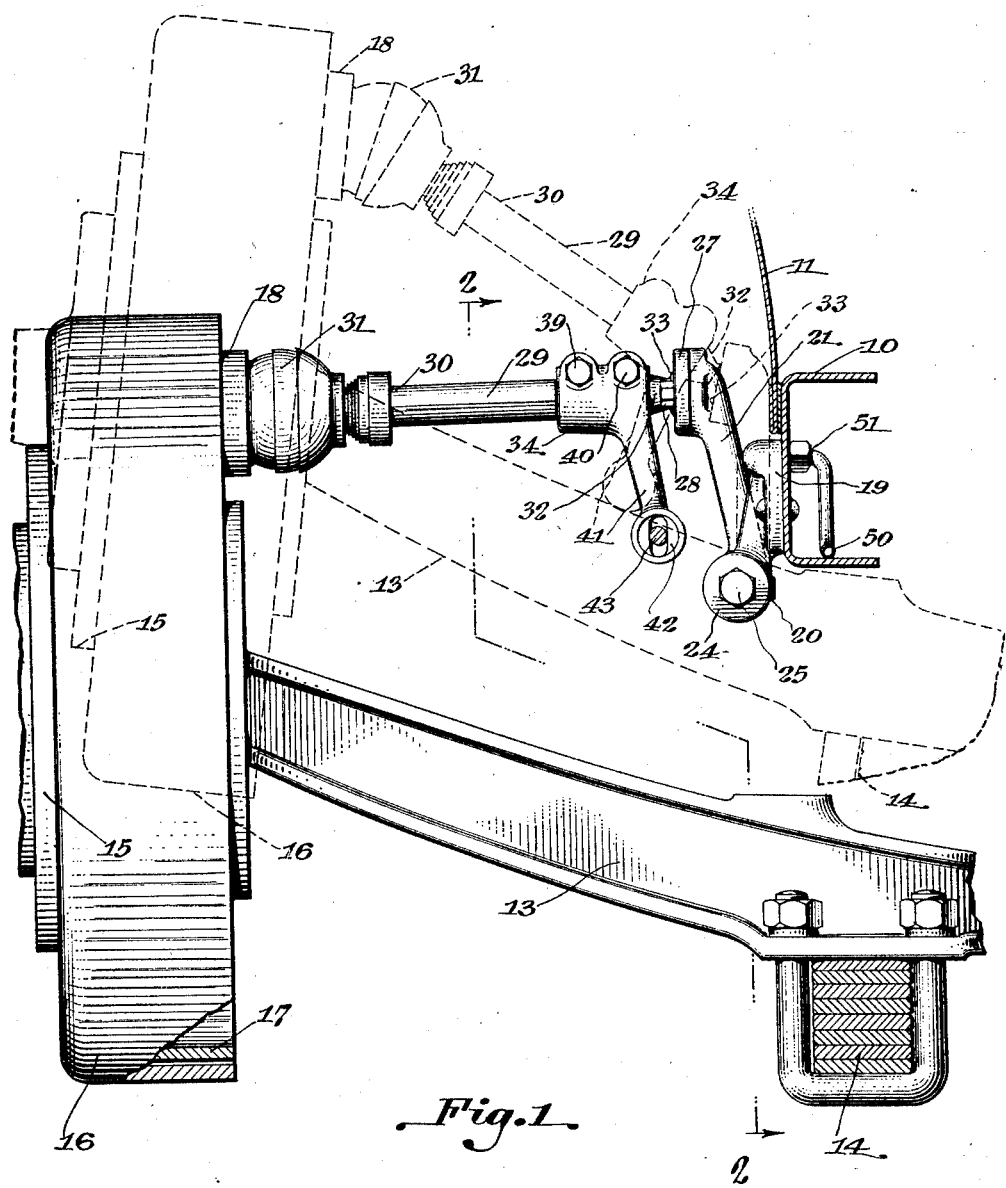
Figure 1A:
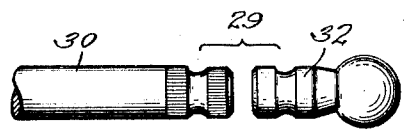

Referring to the drawings, 10 represents one of the side members of the frame of a motor vehicle and 11 is a portion of the fender or other panel part of the vehicle supported on the frame. Its lower end extends down to and forms a joint with the frame as shown in Fig. 1. The fender is preferably supported by a bracket such as shown at 12 in Fig. 2.

Figure 2:
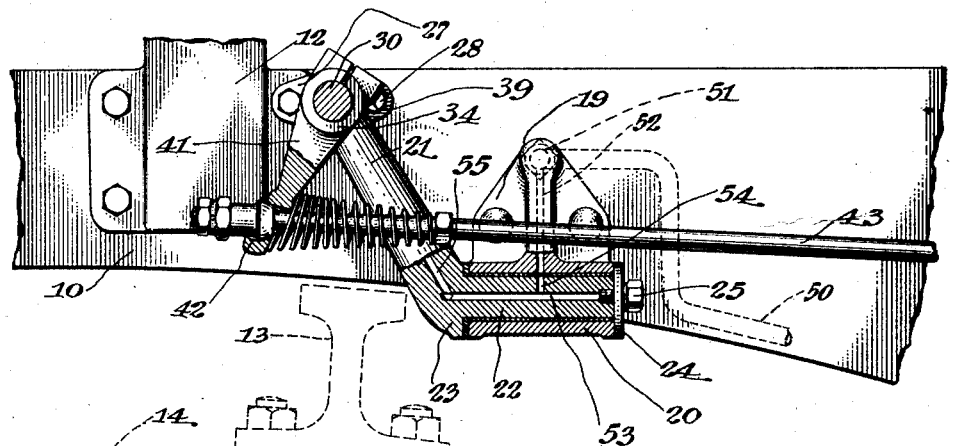
Fig. 2 is a section substantially on the line 2—2 of Fig. 1.
Figure 2:
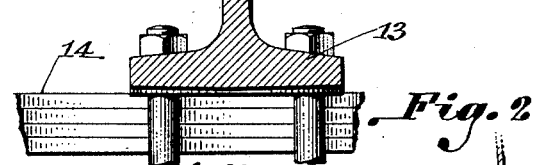

Beneath the frame is an axle 13 which is preferably of I-beam section as shown in Fig. 2, and this axle is connected to the frame by springs, one of which is shown at 14 in Figs. 1 and 2.

The axle shown is the front or steering axle of the vehicle and at its outer end the wheels are pivotally mounted. In Fig. 1 the wheel hub 15 is shown and a brake drum 16 is connected thereto. Within the drum 16 are suitable brake shoes 17 which may be operated by a cam or other shaft or device 18. It will be understood that the oscillation of the device 18 will set the brakes against the brake drum 16.

The axle 13, through its spring connection with the frame, is allowed considerable freedom of movement relative to the frame, and the means for operating the device 18 to set the brakes must be so connected with the frame that this freedom of relative movement of the axle will not be interfered with. It is also desirable that this brake operating mechanism shall be as simple as possible, and it is particularly desirable that there shall be no sliding joints in the mechanism because sliding joints are difficult to keep lubricated and difficult to cover to keep the dust out.

In Figs. 1 and 2 the axle 13 is shown in full lines in normal position, while in dotted lines it is shown in extreme upper position, or the position it would assume if the spring on that side of the vehicle were compressed so that the axle would strike against the frame member 10. That part of the brake operating mechanism which is supported on the frame is, in order to clear the axle, mounted on the frame rearwardly of the axle as shown particularly in Fig. 2. Thus there is a bracket 19 mounted on the frame as shown and this bracket is formed with a bearing part 20 arranged horizontally and longitudinally of the vehicle frame. An arm 21 has a part 22 pivotally supported in the bearing 20 of the bracket 19. A flange 23 at one end of the part 22 and a washer 24 and a bolt 25 at the other end thereof, retain the arm 21 in the bearing 20. The arm 21 extends diagonally from the bearing 20 upwardly and forwardly as shown particularly in Fig. 2 so that its upper end is substantially horizontally in line with the device 18 of the brake, and substantially over the center of the axle 13, when the axle is in its normal position. The upper end of the arm 21 is formed with a ball socket 26 and there is a retaining member 27 secured to the arm 21 as by bolts 28 for retaining a ball member in the socket, as will be hereinafter described.

Figure 3:
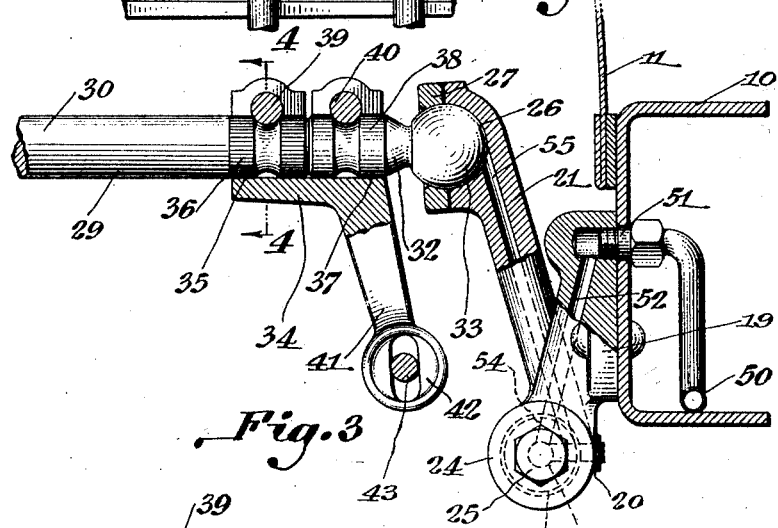
Fig. 3 is an enlarged section taken substantially on the line of the brake operating shaft and extending through the frame of the vehicle.
Figure 4:
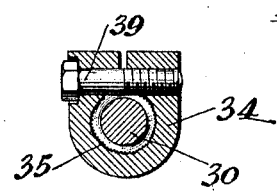
Fig. 4 is a section on the line 4—4 of Fig 3.

A brake operating shaft is arranged between the device 18 and the socket 26. This shaft is indicated generally at 29 and it comprises a member 30 which is connected to the brake device 18 by a suitable universal joint 31, and a ball member 32 which has a ball head 33 arranged in the socket 26 and retained therein by the retaining member 27. The members 30 and 32 of the shaft 29 are connected or coupled together by a coupling member 34 which is in the form of a split sleeve having a serrated part 35 adapted to fit over the serrated end 36 of the member 30, and having a plain part 37 adapted to fit the cylindrical part 38 of the ball member 32. Bolts 39 and 40 are adapted to clamp the respective parts of the coupling member 34 on the members 30 and 32 as shown particularly in Figs. 1, 3 and 4. In Fig. 4 a section is shown through the serrated sleeve portion and the shaft which it surrounds. The coupling 34 is provided with an integral arm 41 which, as shown, extends downwardly and is provided with an eye 42 to which a brake operating rod 43 is suitably connected as shown in Figs. 2 and 3. By the lengthwise movement of this rod 43, the rock shaft 29 is oscillated to thereby rock the cam or other operating device of the brake. The pull of the rod 43 is resisted at the inner end of the shaft 29 by its ball mounting in the arm 21. The ball mounting in the swinging arm 21 permits the operation of the brake mechanism regardless of the position of the axle relative to the frame, and it will be seen that the axle can make its full upward movement to a position of contact with the frame, as shown particularly in Figs. 1 and 2. The separation of shaft 29 into the members 30 and 32 permits the ball member 32 to be more conveniently and economically manufactured and facilitates the assembly of the ball and socket members.

Adjustment of the arm 41 relative to the shaft member 30, and consequently relative to the cam or other device on the shaft 18, may be effected by loosening the bolt 39, withdrawing the shaft 30 from the sleeve 34, rocking the arm 21 on its pivot to accomplish this result, turning the coupling 34 slightly relative to the shaft 30, and then replacing the coupling on the shaft and clamping it with the bolt 39. This form of positive clamp is not required on the ball member 32 because that member turns in the socket 26 and does not transmit any torque as does the shaft 30.

Lubrication of the ball and socket and the bearing of the arm 21 is effected from the pressure oil line of the vehicle. This pressure oil line is indicated in the drawings at 50 and a branch thereof is led to and through the side of the frame member 10 as at 51. Here the bracket 19 is drilled out as shown at 52 so that oil is conveyed to the interior of the bearing 20. The part 22 of the arm 21 is longitudinally drilled as at 53, it is drilled as at 54 to connect with the passage 52, and it is drilled at 55 to connect the passage 53 with the socket 26. Thus oil is conveyed from the pipe 50 through the passage 52 to the bearing 20 and through the passages 53, 54 and 55 to the socket 26, thus keeping these parts lubricated.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In a motor vehicle, the combination of an axle and a frame, of a brake on the axle, a rock shaft connected to the operating part of the brake, an arm pivotally supported on the frame and having a ball socket, a ball member having its head in said socket and a rock shaft operating member forming a coupling between the rock shaft and said ball member.

2. In a motor vehicle, the combination of an axle and a frame, of a brake on the axle, a rock shaft connected to the operating part of the brake, an arm pivotally supported on the frame and having a ball socket, a ball member having its head in said socket and a rock shaft operating member forming a rigid and detachable connection between the rock shaft and said ball member.

3. In a motor vehicle, the combination with the frame and axle, of a brake on the axle, means comprising a multiple-part rock shaft for operating the brake extending from the brake to a point adjacent the frame, an arm pivotally supported on the frame and having a ball socket, a ball member on one part of said means fitting in said socket, a rock shaft operating member coupling the rock shaft parts, and means on the frame for feeding oil to the socket and the bearings of said arm.

4. In a brake operating mechanism, the combination with a rock shaft, an arm pivotally supported, a ball member having its head mounted in a socket in said arm, and a coupling member for connecting said rock shaft and said ball member, said coupling member being adapted to receive the ends of said rock shaft and said ball member in line with each other, and said pivotally supported arm being adapted to swing to permit one of the coupled members being withdrawn from and inserted into said coupling member.

5. In a motor vehicle, the combination with the axle, the brake thereon, and the frame supported on springs on the axle, of brake operating mechanism comprising a rock shaft connected by a universal joint with the brake actuator, an arm swingingly mounted on the frame, a ball member having its head mounted in a socket in said arm, and a coupling member for detachably connecting said rock shaft and said ball member.

6. In a motor vehicle, the combination with the axle, the brake thereon, and the frame supported on springs on the axle, of brake operating mechanism comprising a rock shaft connected by a universal joint with the brake actuator, an arm swingingly mounted on the frame, a ball member having its head mounted in a socket in said arm, a coupling member for detachably connecting said rock shaft and said ball member in line, and an operating arm on said coupling member.

7. In a brake operating mechanism, the combination with a rock shaft, an arm pivotally supported, a ball member having its head mounted in a socket in said arm, a coupling member for connecting said rock shaft and said ball member, and means providing angular adjustment between the coupling member and one of the connected parts by withdrawing the part from the coupling member and turning it relative thereto, said pivotally supported arm being adapted to swing to permit withdrawal of the said part from the coupling member.

8. In a motor vehicle, the combination of an axle, a brake thereon, a frame, springs flexibly supporting the frame from the axle, a rock shaft connected to said brakes for operating them and having its inner end extending to a point adjacent said frame, an arm arranged to oscillate in a vertical plane and having universal connection with the inner end of said shaft, and a bracket on said frame for pivotally supporting said arm, said bracket and arm being so formed and arranged that the rock shaft is maintained substantially over the axle and the bracket is offset relative to the axle so that the axle may have full travel to and against the frame in compressing the springs.

9. In a motor vehicle having a frame and an axle, a brake on the axle, a multiple-part rock shaft connected to the operating part of the brake and to the frame and a rock shaft operating member forming a coupling for said rock shaft parts.

In testimony whereof I affix my signature.

JESSE G. VINCENT.